Aug. 11, 1936.　　　C. A. BICKEL　　　2,050,746
MACHINE TOOL
Filed Feb. 5, 1932　　　8 Sheets-Sheet 1

FIG. 1

INVENTOR
CLIFFORD A. BICKEL.
BY
ATTORNEYS

INVENTOR
CLIFFORD A. BICKEL.
BY
ATTORNEYS

Aug. 11, 1936.         C. A. BICKEL         2,050,746
MACHINE TOOL
Filed Feb. 5, 1932         8 Sheets-Sheet 4

INVENTOR
CLIFFORD A. BICKEL
BY
ATTORNEYS

FIG.11

Aug. 11, 1936.                C. A. BICKEL                2,050,746
                              MACHINE TOOL
                        Filed Feb. 5, 1932          8 Sheets-Sheet 8

INVENTOR.
CLIFFORD A. BICKEL.
BY
ATTORNEYS.

Patented Aug. 11, 1936

2,050,746

UNITED STATES PATENT OFFICE 2,050,746

MACHINE TOOL

Clifford A. Bickel, Sidney, Ohio, assignor to The Monarch Machine Tool Company, Sidney, Ohio, a corporation of Ohio Application February 5, 1932, Serial No. 591,159

22 Claims. (Cl. 82—21)

My invention relates to machine tools and in particular to a method of operation and an apparatus for performing a method of applying tools in separate groups to a work piece. The work piece may be cut longitudinally by one tool or a group of tools and may be cut transversely by another tool or group of tools.

It is one object of the invention to provide a system of electric circuits operable as a unit, preferably from a common source of power, by which one carriage can be automatically operated into the work, along the work, from the work and back to an initial position automatically, the depth of cut of its tool being regulated as desired, and the other tool or group of tools being arranged to proceed to the work, into the work and out of the work.

It is a further object to provide means by which the return of the tool or group of tools may be effected more rapidly automatically by the arrangement of the circuits than the initial movement of the tool.

Referring to the drawings.

Referring to the drawings in detail, 1 indicates the legs supporting the bed 2 of a lathe having a head stock casing 3 in which the head stock shaft 4 is mounted carrying the head stock spindle 5. This shaft 4 is operated through the gear 6, worm 7, gear 8, pinion 9, shaft 10, sprocket 11, chain 12, sprocket 13 driven from the motor in the base designated as 14.

The control of the starting and stopping of the spindle is effected through the hand lever 15 operating the shaft 16, the yoke 17 and the clutch 18. The details of this mechanism are not important and are not therefore generally indicated. They may be of any conventional character. 19 indicates the tail stock and 20 the tail stock spindle.

The tool is provided with two carriages, a front and a rear carriage.

Front carriage

The front carriage is mounted upon the front of the machine and is designated 21. It is provided with an apron 22. It may be moved longitudinally by the hand wheel 23 through the pinion 24, gear 25 and pinion 26 engaging the stationary rack 27 on the tool bed 2.

It is operated under power by the feed rod 28, worm 29, gear 30, shaft 31, gear 32, gear 33, shaft 34, pinion 35, gear 25 and pinion 26 to the rack 27. The feed rod is in turn operated by its motor 37 which carries a worm 38 engaging the worm wheel 39 on the shaft 40, which has a pinion 41 driving the gear 42 on the shaft 43 which carries one half of the magnetic clutch 44 engageable with the other half of the magnetic clutch 45 on shaft 46 carrying the gear 47. The gear 47 meshes with the gear 48 on the driven shaft 49 that carries on its extreme end the worm 50.

The worm 50 engages the gear 51. The gear 51 is mounted on the shaft 52 mounted within the gear box 53 which carries the change speed gear shift levers 54, 55 and 56. The shaft 52 carries the gear 57, which meshes with the gear 58 that is connected to the shaft 59 connected to the feed rod 28. The gear 51, gear 60, gear 61 and gear 62 are fastened to the shaft 52. Gear 63 and gear 57 are connected together and loose on the shaft. Gears 64, 65 and 66 turn with the shaft 67 but are splined thereto for lateral movement. Likewise gears 68 and 69 are mounted on the shaft 67.

Figure 10:
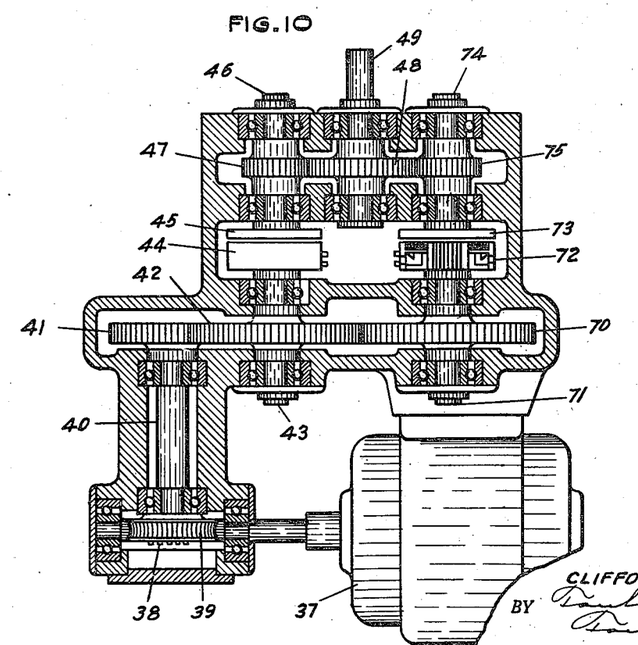
Figure 10 is a section on the line 10—10 of Figure 9.

Returning to Figure 10, it will be noted that the reverse movement can be imparted to the feed rod 28 through the gear 70 engaging the gear 42, shaft 71, magnetic clutch members 72 and 73, shaft 74 and gear 75. By alternately energizing the magnetic clutches 44—45 or 72—73, this reverse movement can be effected to give a movement in opposite directions to the front carriage.

*Front carriage transverse feed*

The front carriage transverse feed is effected by the motor 76 which operates the worm 77, worm wheel 78, shaft 79, gear 80, gear 81 on the shaft 82, gear 82a and screw shaft 82b which engages the bock 83 on the cross slide 84. On the cross slide 84 is mounted the tool slide 85 having a tool holder 86 which in turn carries the tool 87. The tool slide carries a stop bracket 88 which engages a stop screw 89 mounted on the carriage, which limits the inward movement of the tool into the work. The cross slide is adjusted by the hand levers 90 and the tool slide by the hand levers 91.

Figure 7:
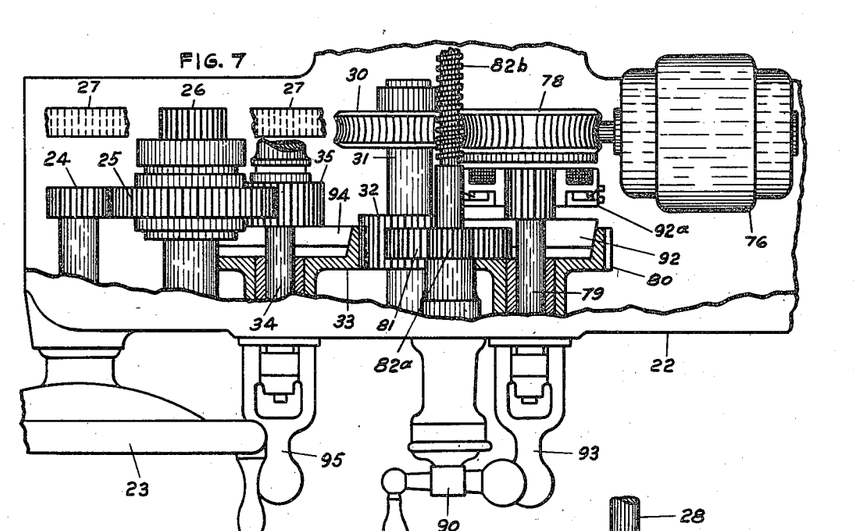
Figure 7 is a top plan view with the apron broken away of the front apron.
Figure 8:
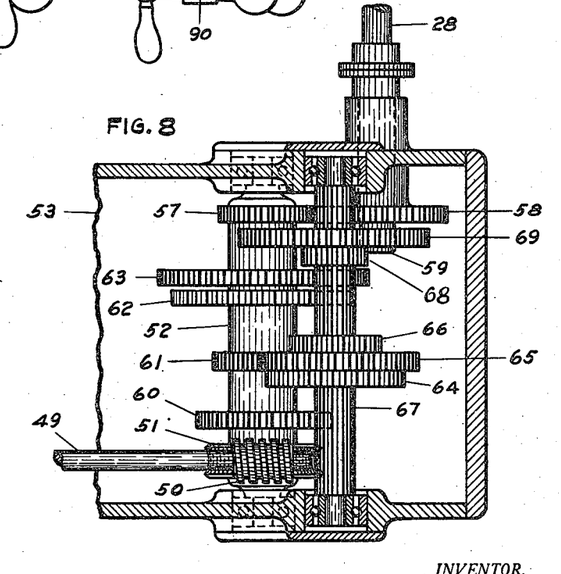
Figure 8 is a section on the line 8—8 of Figure 4 showing the change speed gearing for the feed rod for the front apron.
Figure 9:
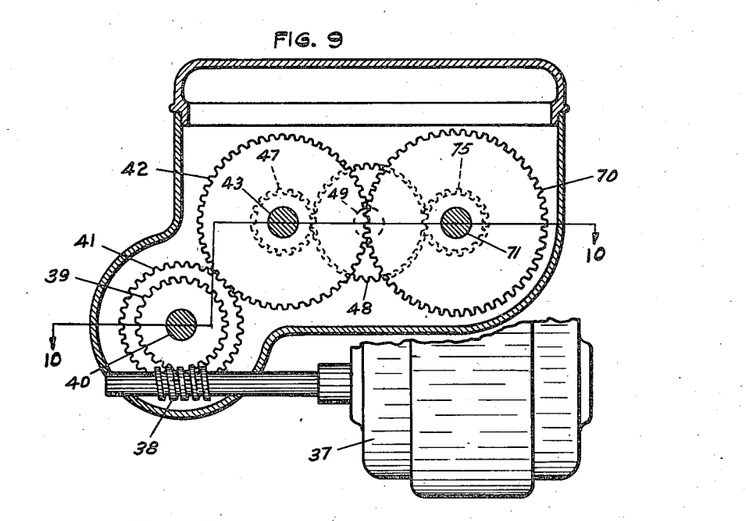
Figure 9 is a section through the gear box on the line 9—9 of Figure 4 for the front apron.

The front apron as shown in Figure 7 is provided with a cross feed friction clutch designated generally 92 operated by the handle 93 and the longitudinal feed clutch designated 94 is operable with the handle 95.

The switch member 96 has a movable member 97 which is engaged by the stop 98 on the carriage for moving it against the contact members 99 and 100. The purpose of this switch when closed at the end of the longitudinal movement of the carriage and tool is to cause the tool to back out away from the work. When the tool backs out to a point where the stop 101 on the carriage engages the switch member 102 closing the contact members 103 and 104, then the carriage is moved to the right hand rapidly. This continues until the stop 105 moves the contact member 106 away from the terminals 107 and 108, bringing the carriage to rest.

*Rear carriage*

Figure 1:
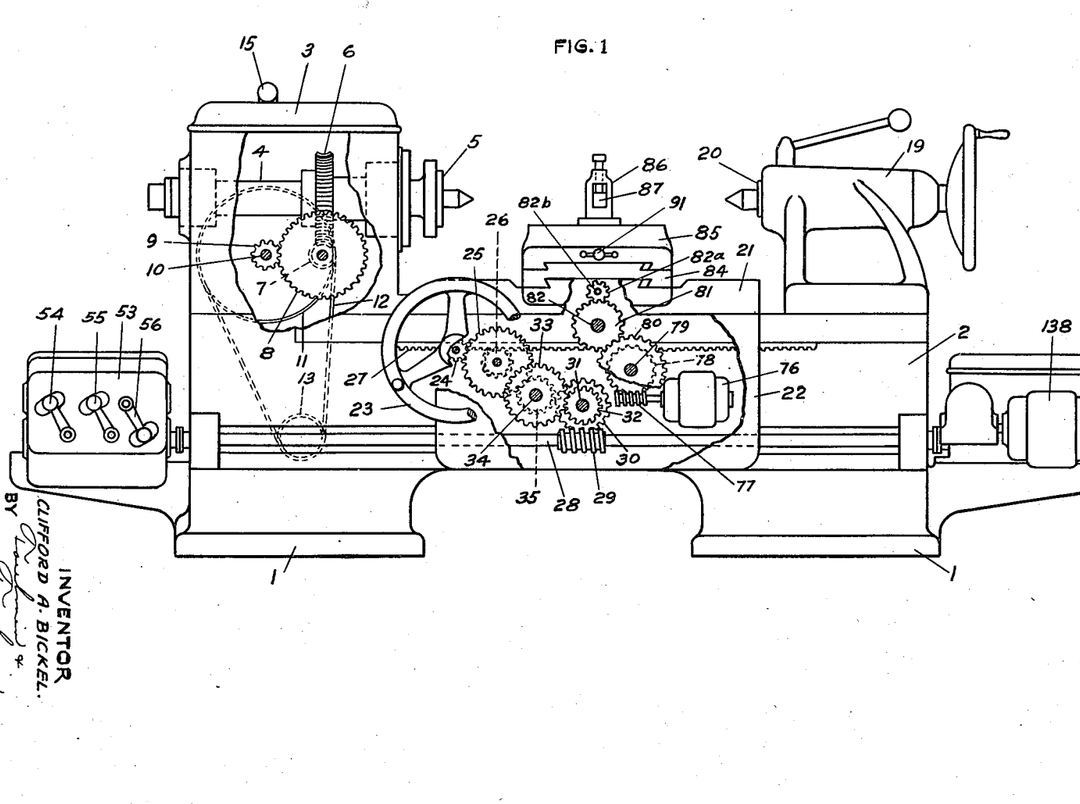
Figure 1 is a front elevation of the tool with its apron and head stock casing partially broken away to disclose the gearing therein.
Figure 2:
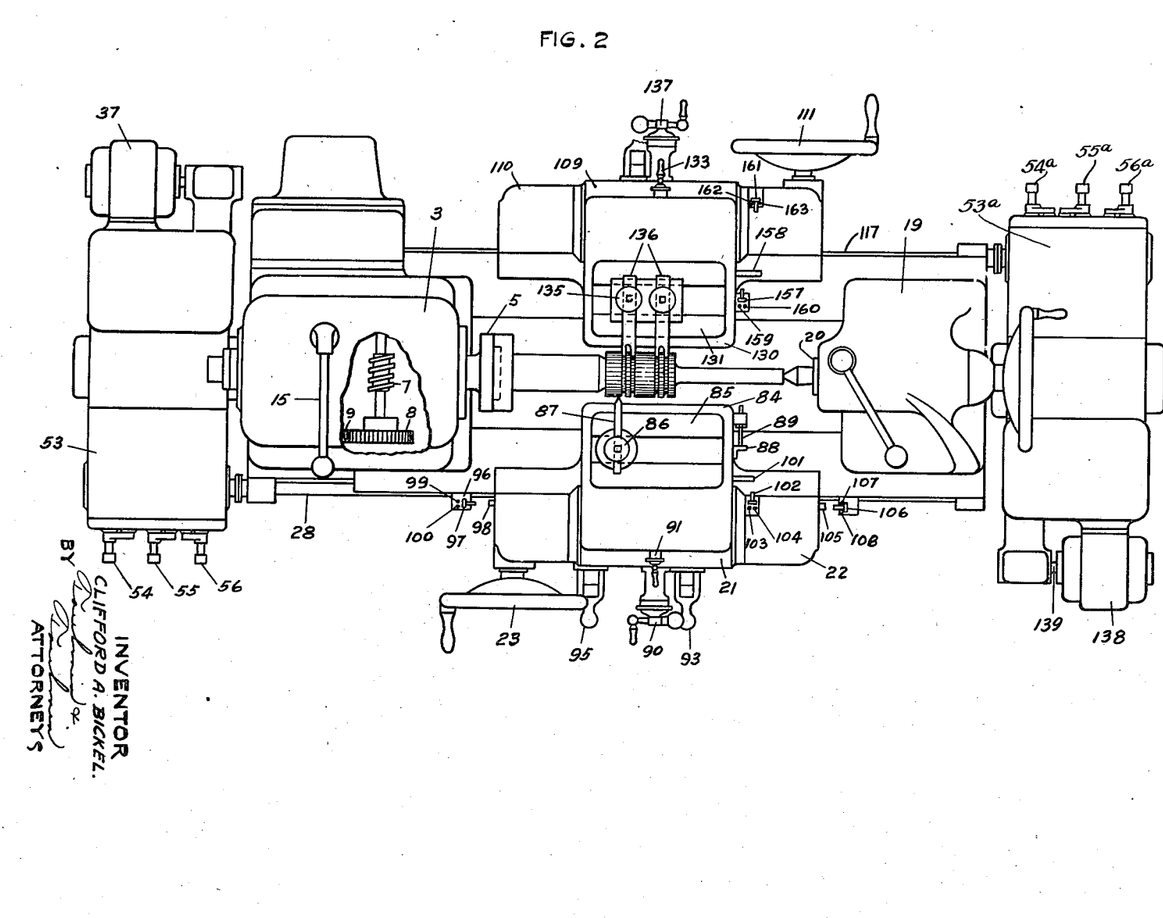
Figure 2 is a top plan view of the tool.
Figure 3:
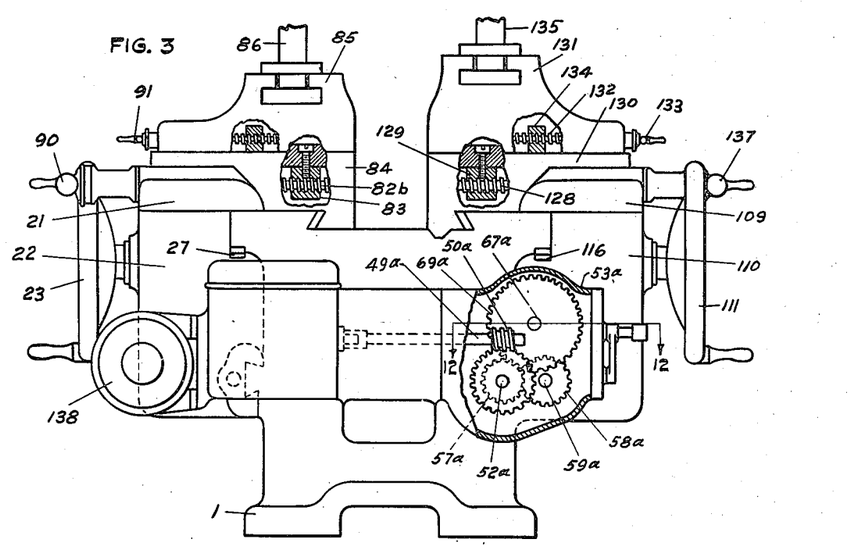
Figure 3 is an end elevation from the right-hand end of the tool with the carriages and tool slides broken away to indicate the screw and block mechanisms.
Figure 4:
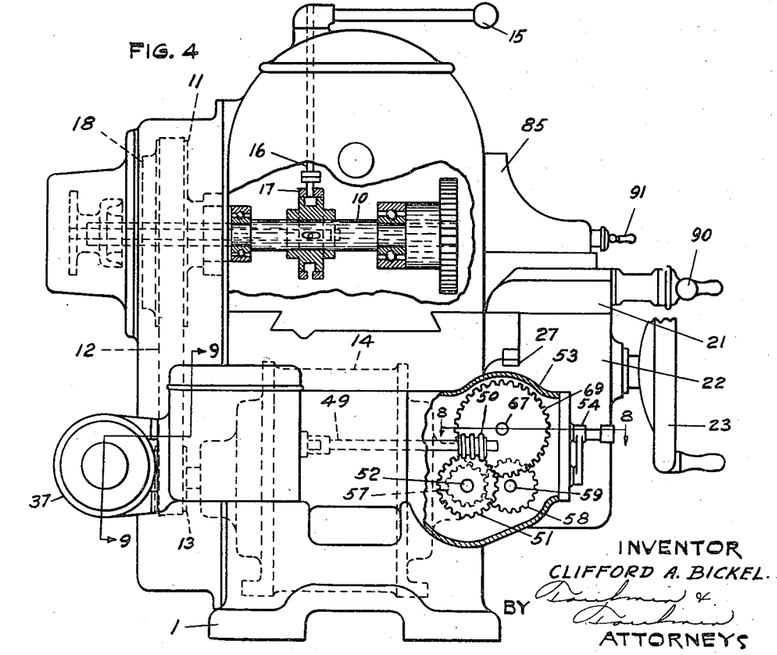
Figure 4 is an end elevation from the left-hand end of the tool.
Figure 5:
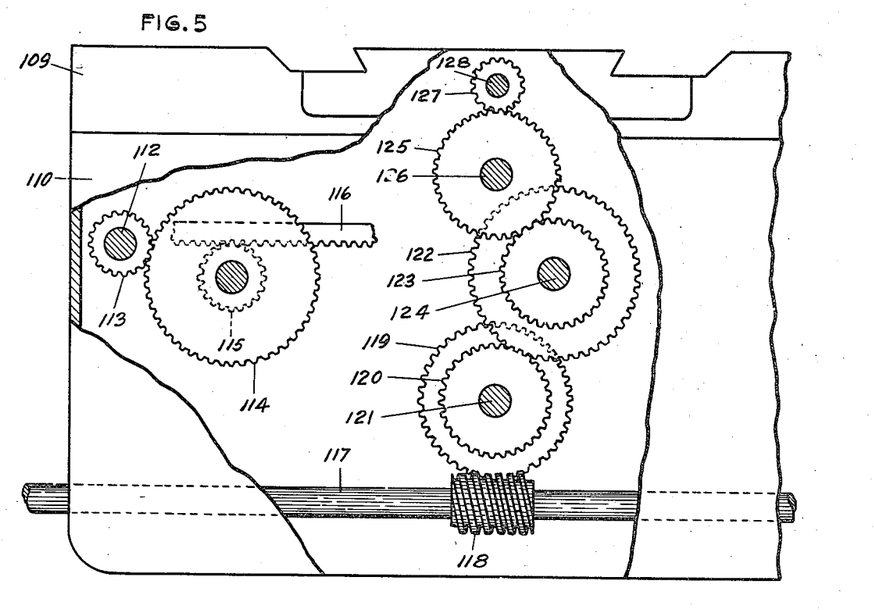
Figure 5 is a front elevation of the rear apron broken away to show in detail a portion of the gearing, particularly in connection with the hand feed and the feed rod feed for the cross slide.
Figure 6:
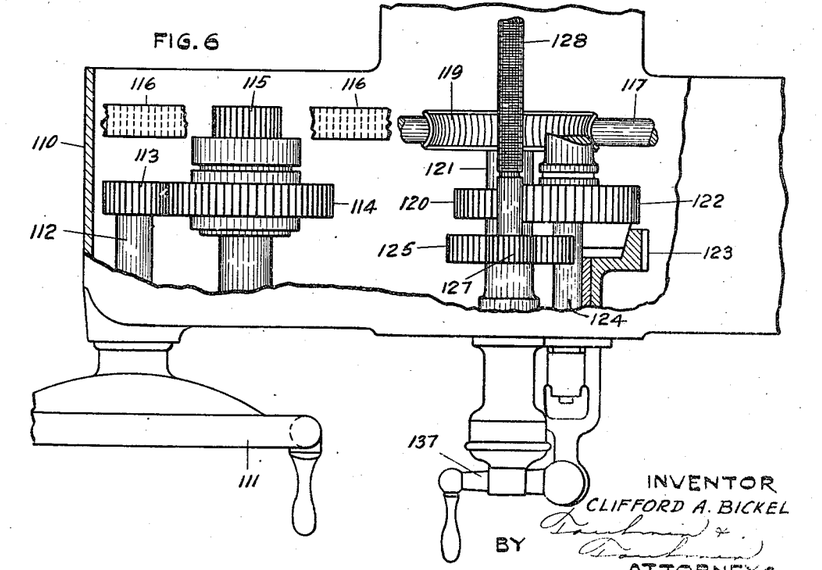
Figure 6 is a top plan view thereof with the apron broken away.

Turning to the rear carriage as shown in Figures 5 and 6, it will be noted that longitudinal movement of the carriage 109 with its apron 110 is effected by the hand wheel 111 operating a shaft 112, pinion 113, gear 114, pinion 115 on the stationary rack 116 carried on the tool bed. The longitudinal adjustment of this carriage is manual.

The feed of the tool or tools carried by the rear carriage to and from the work is through the feed rod 117, worm 118, worm gear 119, pinion 120 on shaft 121, gear 122, pinion 123 on shaft 124, gear 125, shaft 126, pinion 127 on a cross slide screw shaft 128 which is threaded in the cross slide block 129 carried on the cross slide 130. Mounted on the cross slide is the tool slide 131 which is moved by the tool slide screw 132 and hand lever 133, which screw operates in the block 134 on the cross slide 130. A tool carrier or carriers 135 carry the tools 136. The carriage is adjusted through its screw 128 and through the hand lever 137.

The feed rod 117 for the rear carriage is operated by its motor 138 through the shaft 139. The worm 140, worm gear 141, shaft 142, gear 143, gear 144, shaft 145, magnetic clutch 146—147 and gear 148 which meshes with the gear 149, operate the shaft 150. This is the in feed. To reverse the direction of the shaft 150 for out feed, clutch 146—147 is disengaged and the drive takes place through gear 151, shaft 152, magnetic clutch 153—154, shaft 155, gear 156, gear 149 to shaft 150. The worm 50a engages the gear 51a. The gear 51a is mounted on the shaft 52a within the gear box 53a which carries the change speed gear shift levers 54a, 55a, and 56a. The shaft 52a carries the gear 57a which meshes with the gear 58a that is connected to the shaft 59a connected to the feed rod 117. The gear 51a, gear 60a, gear 61a and gear 62a are fastened to the shaft 52a. Gear 63a and gear 57a are connected together and loose on the shaft. Gears 66a, 65a, and 64a turn with the shaft 67a but are splined thereto for lateral movement. Likewise gears 68a and 69a are mounted on the shaft 67a.

The switch member 157 is engaged by the stop 158 on the tool slide, closing it across the terminals 159 and 160 which brings about the de-energizing of clutch 146—147 and the energizing of clutch 153—154, thereby reversing the direction of the tool slide, returning the tools to their initial position, whereupon stop 158 engages the switch 161 and opens it by moving it away from the contact members 162 and 163, bringing the tool slide to rest.

*Wiring diagram*

Figure 11:
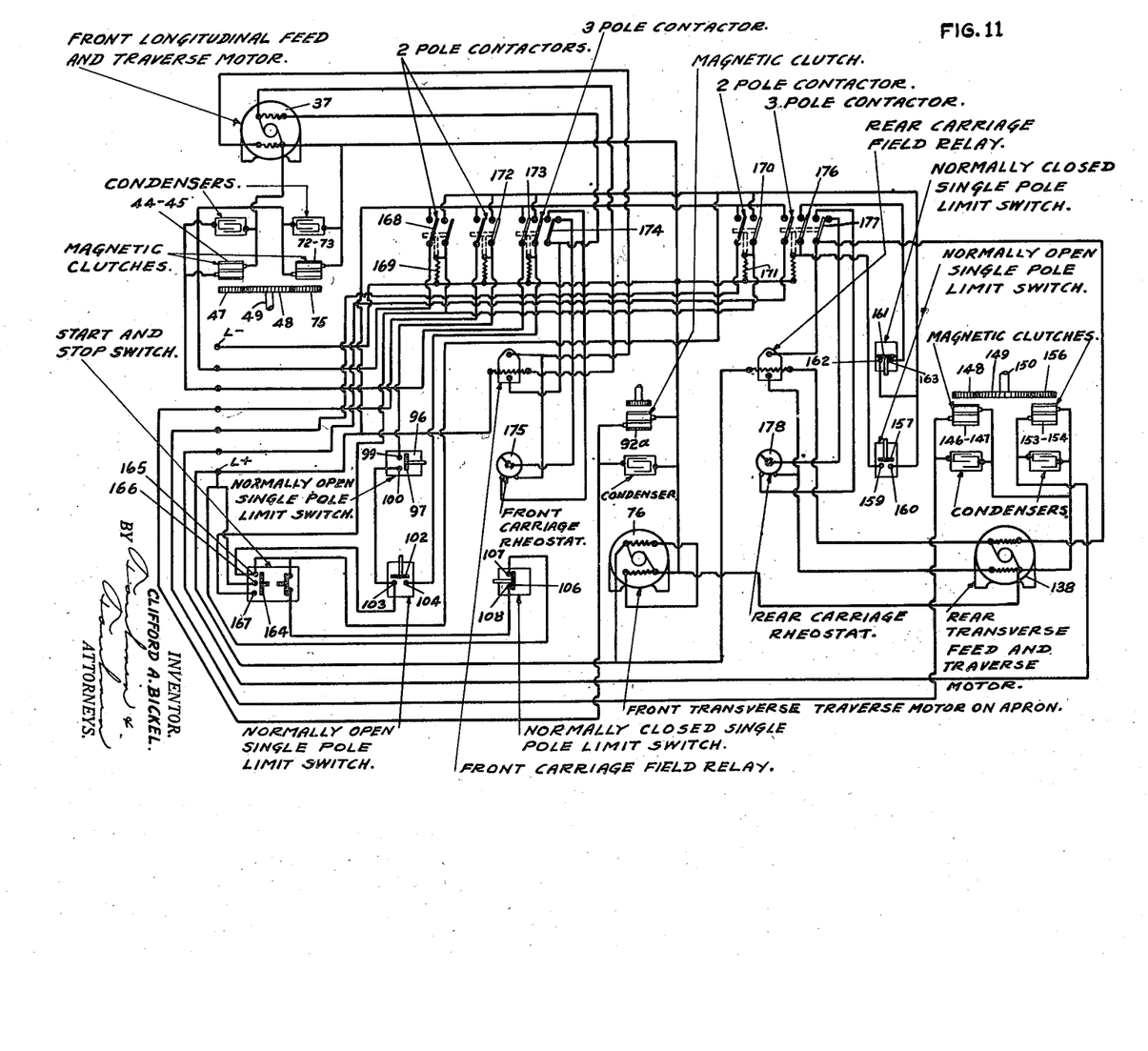
Figure 11 is a wiring diagram.
Figure 12:
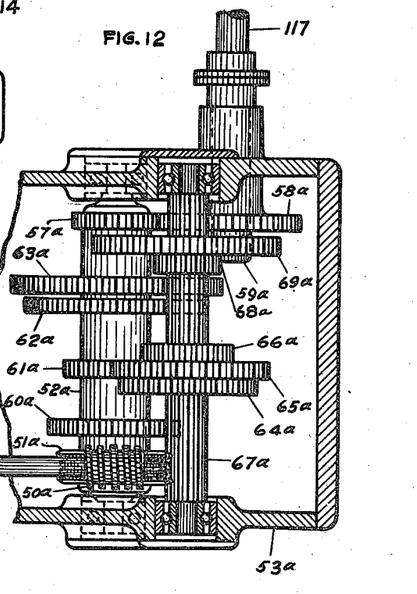
Figure 12 is a section on the line 12—12 of Figure 3.
Figure 13:
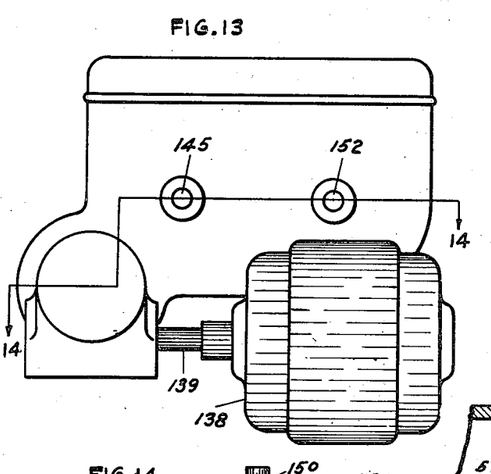
Figure 13 is an end elevation of the rear slide drive motor and gear box.
Figure 14:
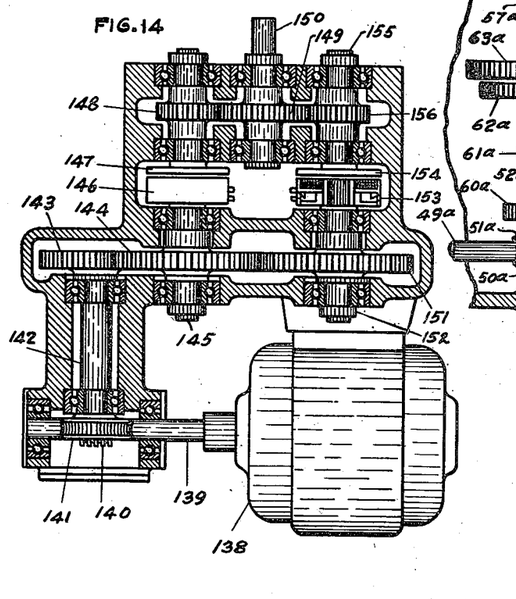
Figure 14 is a section on the line 14—14 of Figure 13.

To start the operation of the tool after the tool 87 has been brought to the work by the engagement of the bracket 88 with the stop 89, I close the starter button 164 across the terminals 165, 166 and 167, which results in closing the switch 168 by energizing coil 169. This also results in closing the switch 170 having its coil 171 energized. This results in the closing of the clutch 72—73 for feeding of the front carriage to the left through the motor 37. This circuit results in energizing the magnet 146—147 so that the motor 138 can feed the cross slide on the rear carriage inwardly. This continues until the switch 96 is closed to the cross-terminals 99 and 100. This results in opening the two-pole contactor 168. This results in the magnet 92a controlling the apron motor closing so that the apron motor will feed the tool 87 out at the end of the longitudinal movement. Upon the closing of this switch, switch 102 being closed, the three-pole contactor 173 is closed. In doing so, the switch arm 174 is so moved that the front carriage rheostat 175 which has reduced the speed of the motor 37 is shunted, permitting full speed of the motor on its return movement. This circuit being closed, two-pole contactor 172 is released. This results in energizing the magnetic clutch 44—45, permitting the motor 37 to drive the front carriage rapidly to the right until the stop 105 engages switch 106 and breaks the contact of that switch with the terminals 107 and 108. Upon opening the switch 106, the three-pole contactor 173 is also opened, the carriage being stopped at starting position.

The rear carriage continues inwardly until the stop 158 closes the switch 157, energizing the three-pole switch 176 and thereby opening the two-pole contactor 170, magnetic clutch 146—147 and closing the magnetic clutch 153—154 for the purpose of moving the carriage outwardly and at the same time by the movement of the switch arm 177, shunting the rheostat 178, permitting the motor 138 to withdraw the cross slide rapidly, which continues until the stop 158 engages the switch 161, thereby rendering the entire system inoperative and bringing the cross slide to rest.

It will be further understood that I desire to comprehend within my invention such modifications as may be necessary to adapt it to varying conditions and uses.

Having thus fully described my invention, what I claim as new and desire to secure by Letters Patent, is:

1. In a machine tool having means for rotatably supporting a work piece, a longitudinally movable carriage, a transversely movable slide carrying a tool, an electric motor for operating the carriage longitudinally, electric means for controlling the application of power by said motor, an electric motor for operating the slide transversely, a switch for operating the slide motor upon the movement of the carriage to a predetermined limit, and a switch controlling said electric means for reversing the movement of the carriage by the movement of the slide.

2. In a machine tool having means for rotatably supporting a work piece, a longitudinally movable carriage, a transversely movable slide carrying a tool, an electric motor for operating the carriage longitudinally, electric means for controlling the application of power by said motor, an electric motor for operating the slide transversely, a switch for operating the slide motor upon the movement of the carriage to a predetermined limit, a switch controlling said electric means for reversing the movement of the carriage by the movement of the slide, and a third switch for rendering both motors inoperative upon the movement of the carriage to a predetermined position.

3. In a machine tool having means for rotatably supporting a work piece, a longitudinally movable carriage, a transversely movable slide carrying a tool, an electric motor for operating the carriage longitudinally, electric means for controlling the application of power by said motor, an electric motor for operating the slide transversely, a switch for operating the slide motor upon the movement of the carriage to a predetermined limit, a switch controlling said electric means for reversing the movement of the carriage by the movement of the slide, and a third switch for rendering both motors inoperative upon the movement of the carriage to a predetermined position, one of said motors being carried by the carriage.

4. In a machine tool having means for rotatably supporting a work piece, a carriage slidable on the machine tool, a cross slide slidable thereon, means to limit the movement of the cross slide inwardly, a tool on said cross slide, an electric motor to move said carriage and cross slide longitudinally, electric mans for controlling the application of power by said motor, a second electric motor for moving said cross slide transversely of the tool, a switch operated by the slide for controlling the carriage movement, a switch controlling said electric means operated by the carriage for controlling the slide movement, and a third switch for rendering both motors inoperative to move the carriage on the slide.

5. In a machine tool having means for rotatably supporting a work piece, a carriage slidable on the machine tool, a cross slide slidable thereon, means to limit the movement of the cross slide inwardly, a tool on said cross slide, an electric motor to move said carriage and cross slide longitudinally with gearing connected thereto, a second electric motor for moving said cross slide transversely of the tool, a switch operated by the slide for controlling the carriage movement, a switch operated by the carriage for controlling the slide movement, a third switch for rendering both motors inoperative to move the carriage on the slide, magnetic clutches in circuit with the carriage moving motor and gearing associated therewith, whereby the operation of the switches will select the magnetic clutch necessary for the motor to drive the carriage in a predetermined direction.

6. In a machine tool having means for rotatably supporting a work piece, a carriage slidable on the machine tool, a cross slide slidable thereon, means to limit the movement of the cross slide inwardly, a tool on said cross slide, a motor to move said carriage and cross slide longitudinally with gearing connected thereto, a second motor for moving said cross slide transversely of the tool, a switch operated by the slide for controlling the carriage movement, a switch operated by the carriage for controlling the slide movement, a third switch for rendering both motors inoperative to move the carriage on the slide, magnetic clutches in circuit with the carriage moving motor and gearing associated therewith, whereby the operation of the switches will select the magnetic clutch necessary for the motor to drive the carriage in a predetermined direction, and a magnetic clutch associated with the carriage motor for operating the slide whereby, when its switch is operated, the magnetic clutch will be energized and the slide actuated.

7. In a machine tool having means for revolving a work piece, a carriage thereon, a slide on the carriage, a motor for operating the slide, a magnetic clutch associated therewith, a switch operable by the carriage for connecting the motor and slide, a motor for the carriage, gearing for moving it in opposite directions, a pair of magnetic clutches for connecting the motor to alternate sets of gearing, a switch operable by the slide for controlling the selection of said clutches, a starting switch for selecting the other of said clutches, and a stopping switch for rendering all of the clutches inoperative.

8. In a machine tool having means for revolving a work piece, a carriage thereon, a slide on the carriage, a motor for operating the slide, a magnetic clutch associated therewith, a switch operable by the carriage for connecting the motor and slide, a motor for the carriage, gearing for moving it in opposite directions, a pair of magnetic clutches for connecting the motor to alternate sets of gearing, a switch operable by the slide for controlling the selection of said clutches, a starting switch for selecting the other of said clutches, a stopping switch for rendering all of the clutches inoperative, a second carriage, a cross slide thereon, a motor for operating said cross slide transversely of the machine tool, gearing for said motor to move the cross slide in opposite directions, magnetic clutches associated with respective parts of the gearing for connecting the motor thereto, and limiting switches actuated by the movement of the cross slide for reversing and rendering inoperative said clutches.

9. In a machine tool having means for revolving a work piece, a carriage thereon, a slide on the carriage, a motor for operating the slide, a magnetic clutch associated therewith, a switch operable by the carriage for connecting the motor and slide, a motor for the carriage, gearing for moving it in opposite directions, a pair of magnetic clutches for connecting the motor to alternate sets of gearing, a switch operable by the slide for controlling the selection of said clutches, a starting switch for selecting the other of said clutches, a stopping switch for rendering all of the clutches inoperative, a second carriage, a cross slide thereon, a motor for operating said cross slide transversely of the machine tool, gearing for said motor to move the cross slide in opposite directions, magnetic clutches associated with respective parts of the gearing for connecting the motor thereto, and limiting switches actuated by the movement of the cross slide for reversing and rendering inoperative said clutches, the first of said clutches being operated by the last cross slide being rendered inoperative by the starting switch.

10. In a machine tool having means for rotatably supporting the work piece, oppositely-disposed carriages, cross slides mounted thereon, motor means for reciprocating one of said cross slides transversely, a switch operated by the cross slide for reversing its movement, and a switch for terminating its movement, a second motor means for moving the other carriage and cross slide longitudinally, a switch operated by the second cross slide for reversing the direction of movement of the carriage longitudinally, a motor for the second cross slide, a switch operable by the movement of the carriage for connecting the motor to the cross slide, and a stop switch operable by the second carriage adapted to render the movement of the carriage and second cross slide inoperative, and a common starter switch and a common electric circuit for all three motors.

11. In a machine tool having means for rotatably supporting the work piece, oppositely-disposed carriages, cross slides mounted thereon, motor means for reciprocating one of said cross slides transversely, a switch operated by the cross slide for reversing its movement, a switch for terminating its movement, a second motor means for moving the other carriage and cross slide longitudinally, a switch operated by the second cross slide for reversing the direction of movement of the carriage longitudinally, a motor for the second cross slide, a switch operable by the movement of the carriage for connecting the motor to the cross slide, a stop switch operable by the second carriage adapted to render the movement of the carriage and second cross slide inoperative, a common starter switch, a common electric circuit for all three motors, a rheostat for reducing the speed inwardly of the first cross slide, and a rheostat for reducing the speed longitudinally of the second cross slide.

12. In a machine tool having means for rotatably supporting the work piece, oppositely-disposed carriages, cross slides mounted thereon, motor means for reciprocating one of said cross slides transversely, a switch operated by the cross slide for reversing its movement, a switch for terminating its movement, a second motor means for moving the other carriage and cross slide longitudinally, a switch operated by the second cross slide for reversing the direction of movement of the carriage longitudinally, a motor for the second cross slide, a switch operable by the movement of the carriage for connecting the motor to the cross slide, a stop switch operable by the second carriage adapted to render the movement of the carriage and second cross slide inoperative, a common starter switch, a common electric circuit for all three motors, a rheostat for reducing the speed inwardly of the first cross slide, a rheostat for reducing the speed longitudinally of the second cross slide, and means associated with the switch for reversing the movement of the first cross slide and the return movement of the second carriage whereby said rheostats are shunted.

13. In a machine tool having means for rotatably supporting the work piece, oppositely-disposed carriages and cross slides thereon, a motor for driving the first carriage longitudinally, a motor for driving the second slide transversely of the machine tool, a third motor for moving the first cross slide transversely, a common electric circuit for said motors, reversing magnetic switches and gearing for the first two motors, a magnetic clutch for the third motor, a common starting switch for all motors, and switches operable by the cross slides and first mentioned carriage for controlling the movements of the first carriage and the two cross slides.

14. In combination in a machine tool having means for rotatably supporting the work piece, a pair of carriages, cross slides thereon, a motor carried by one carriage for operating its cross slide, a motor at one end of the machine tool for operating that carriage having a change gear mechanism and selective magnetic clutches, similar mechanism at the other end of the machine tool for operating the cross slide on the second carriage, a common electric circuit, a magnetic clutch in said circuit for connecting the cross slide motor on the first carriage to the cross slide, and a system of switches operable by the movements of the first carriage and the two cross slides for energizing said magnetic clutches whereby the first carriage moves longitudinally to the left and to the right and its cross slide moves outwardly and the second cross slide moves inwardly and outwardly on a stationary carriage.

15. In combination in a machine tool having means for rotatably supporting the work piece, a pair of carriages, cross slides thereon, a motor carried by one carriage for operating its cross slide, a motor at one end of the machine tool for operating that carriage having a change gear mechanism and selective magnetic clutches, similar mechanism at the other end of the machine tool for operating the cross slide on the second carriage, a common electric circuit, a magnetic clutch in said circuit for connecting the cross slide motor on the first carriage to the cross slide, and a system of switches operable by the movement of the first carriage and the two cross slides for energizing said magnetic clutches whereby the first carriage moves longitudinally to the left and to the right and its cross slide moves outwardly and the second cross slide moves inwardly and outwardly on a stationary carriage, and means for manually adjusting the second carriage.

16. In combination in a machine tool having means for rotatably supporting the work piece, a pair of carriages, cross slides thereon, a motor carried by one carriage for operating its cross slide, a motor at one end of the machine tool for operating that carriage having a change gear mechanism and selective magnetic clutches, similar mechanism at the other end of the machine tool for operating the cross slide on the second carriage, a common electric circuit, a magnetic clutch in said circuit for connecting the cross slide motor on the first carriage to the cross slide, and a system of switches operable by the movements of the first carriage and the two cross slides for energizing said magnetic clutches whereby the first carriage moves longitudinally to the left and to the right and its cross slide moves outwardly and the second cross slide moves inwardly and outwardly on a stationary carriage, and speed control means for the respective motors on either end of the machine tool.

17. In combination in a machine tool having means for rotatably supporting the work piece, a pair of carriages, cross slides thereon, a motor carried by one carriage for operating its cross slide, a motor at one end of the machine tool for operating that carriage having a change gear mechanism and selective magnetic clutches, similar mechanism at the other end of the machine tool for operating the cross slide on the second carriage, a common electric circuit, a magnetic clutch in said circuit for connecting the cross slide motor on the first carriage to the cross slide, and a system of switches operable by the movements of the first carriage and the two cross slides for energizing said magnetic clutches whereby the first carriage moves longitudinally to the left and to the right and its cross slide moves outwardly and the second cross slide moves inwardly and outwardly on a stationary carriage, speed control means for the respective motors on either end of the machine tool, and means during the reversing of the mechanism connected thereto for shunting said speed control means.

18. In a machine tool, electric power means, a carriage, a tool slide mounted thereon carrying a tool, an electric motor associated with said carriage for moving said slide, electric means to reverse the application of power from said motor to said tool slide, and means to control said reversal by the movement of said tool slide.

19. In a machine tool, a carriage, a slide, electric power means to move said carriage, an electric motor carried by the carriage for operating said slide and operably connected thereto, and means controlling said slide operating motor operated by the movement of said carriage.

20. In a machine tool, a carriage, a tool slide, a tool moving means, electric power means to actuate said carriage, an electric motor associated with said carriage to drive said slide, magnet means to control the application of power means to said tool moving means, and a limit switch means operable by the movement of the tool moving means to operate said magnet means.

21. In a machine tool, a carriage and slide comprising a tool moving means, an electric motor driving said carriage, an electric motor driving said tool slide, limit switches operated by the movement of said carriage and said slide, said switches controlling said motors.

22. In a machine tool, a carriage and slide comprising a tool moving means, an electric motor driving said carriage, an electric motor driving said tool slide, limit switches operated by the movement of said carriage and said slide, said switches controlling said motors, and magnet means associated with at least one of said motors so controlled by said limit switch means as to determine the direction of driving by said motor.

CLIFFORD A. BICKEL.